United States Patent Office 2,983,144
Patented May 9, 1961

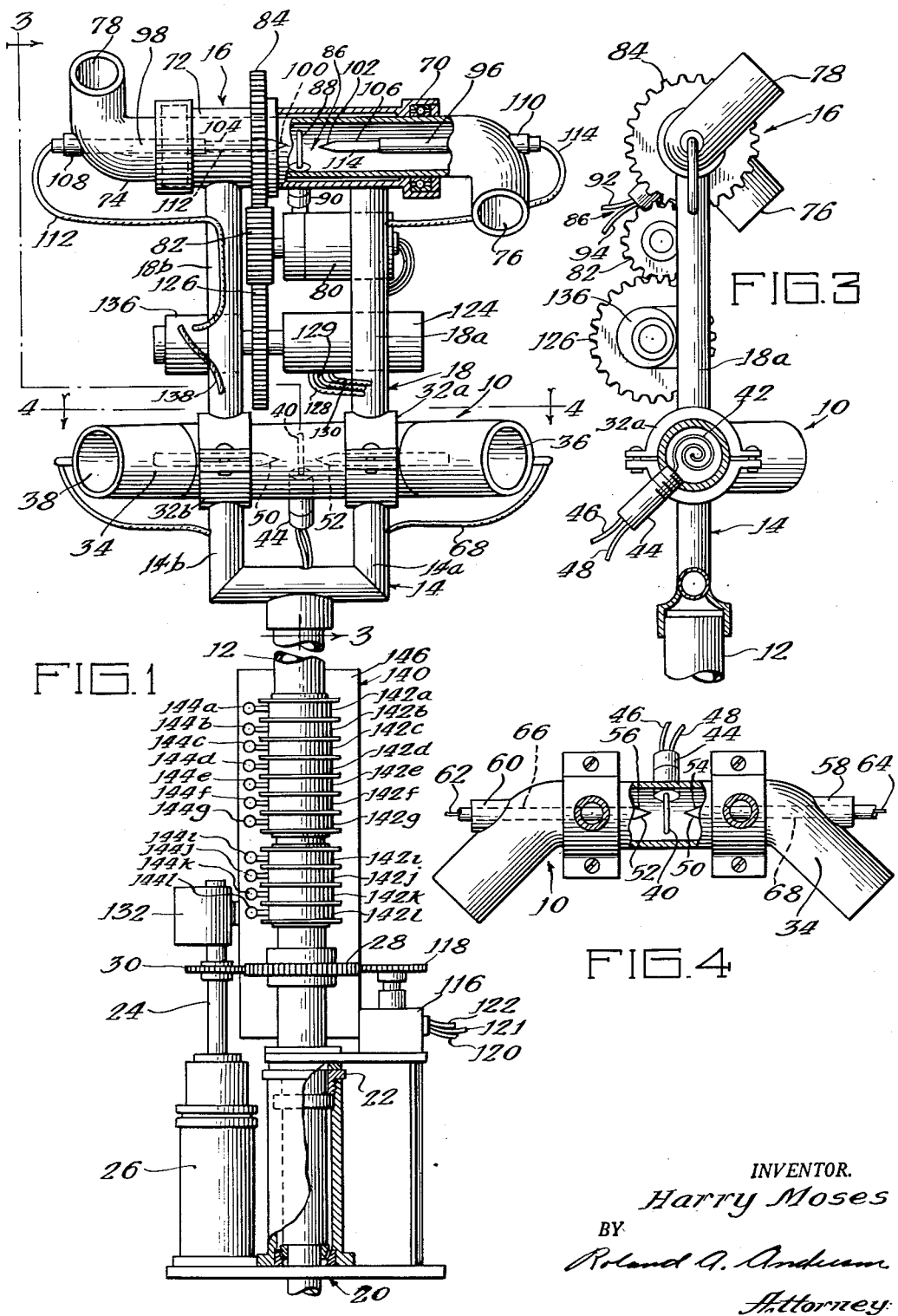

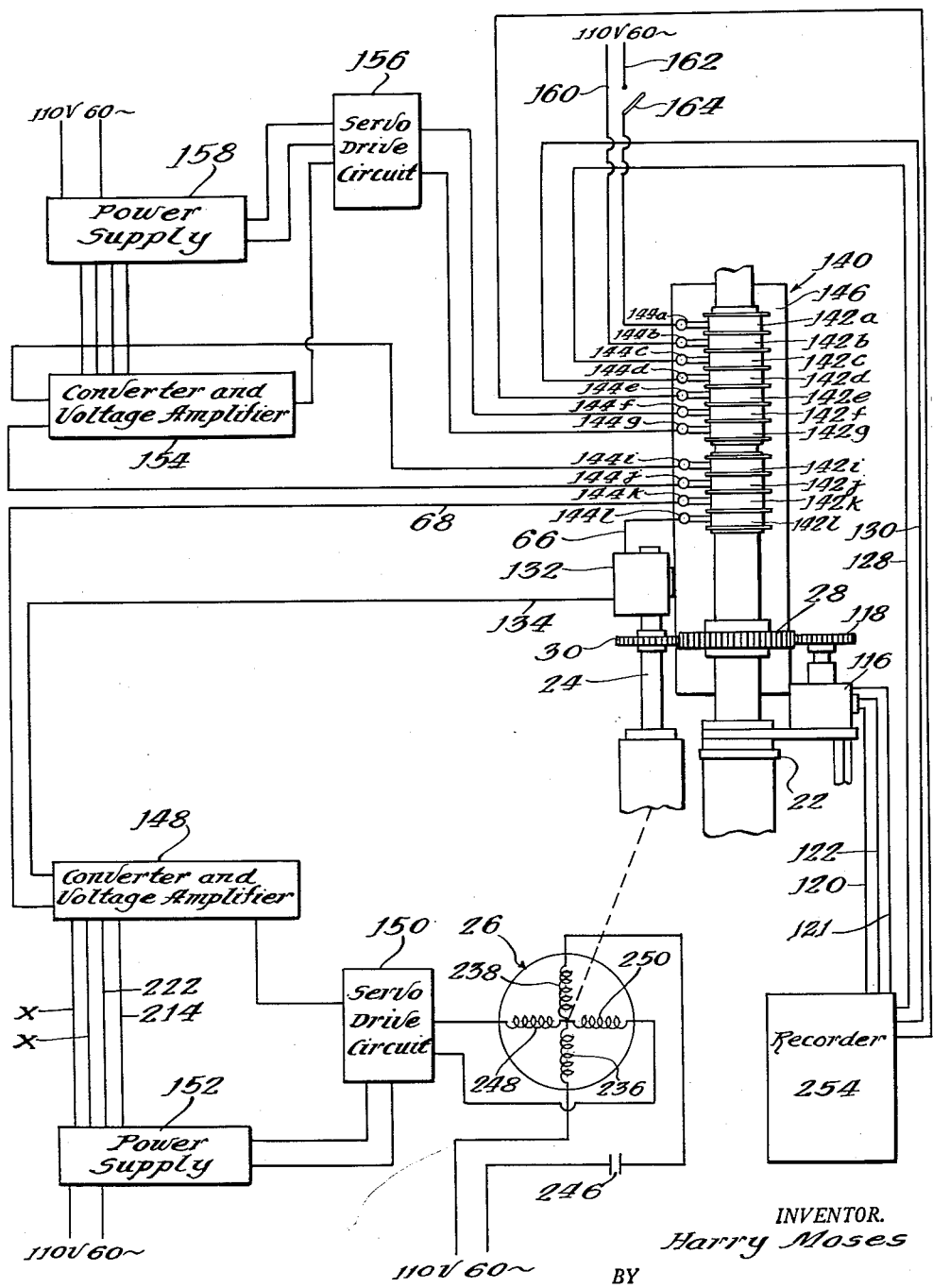

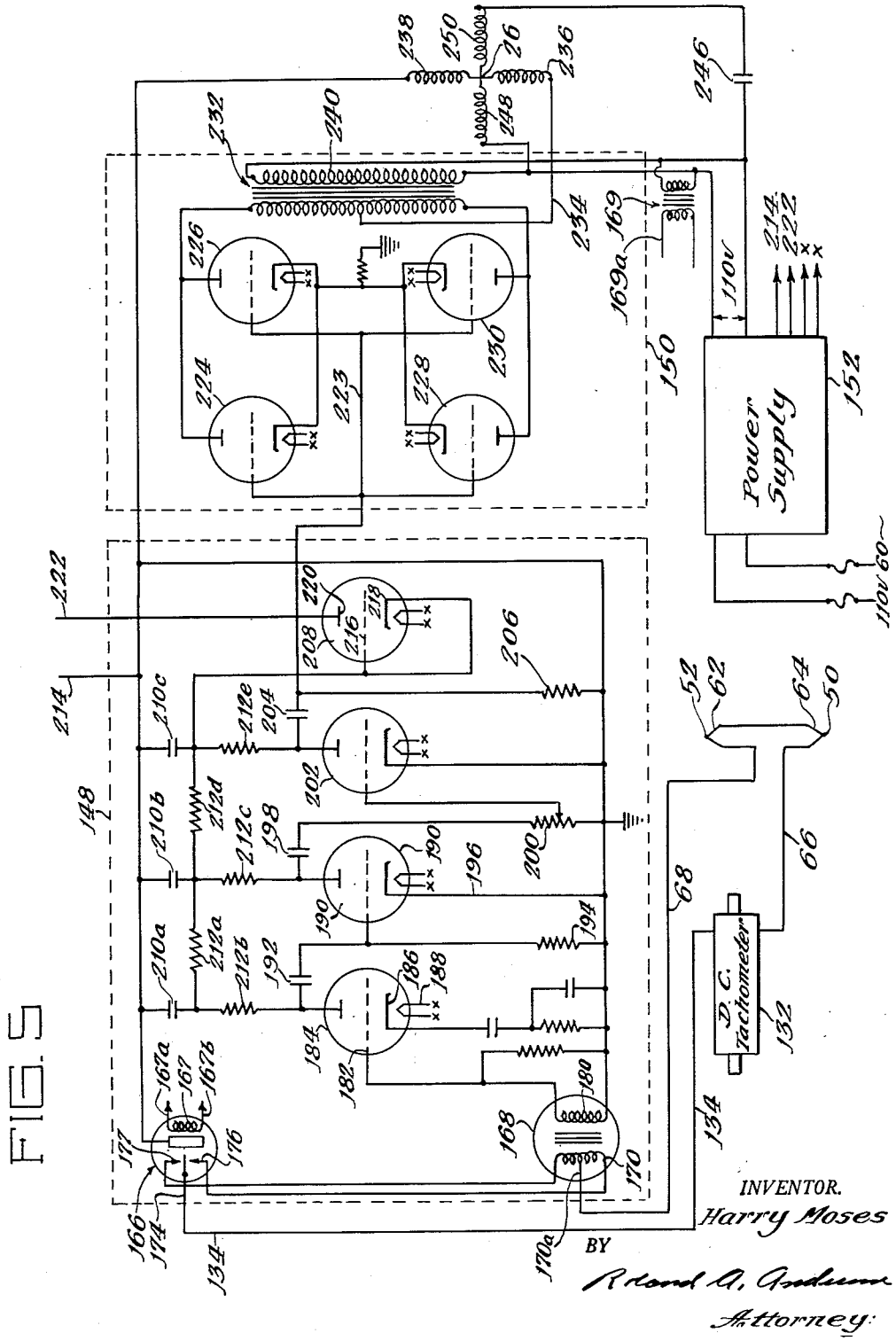

2,983,144

ELECTRONIC BIVANE WIND DIRECTION INDICATOR

Harry Moses, Park Forest, Ill., assignor to the United States of America as represented by the United States Atomic Energy Commission Filed Feb. 13, 1956, Ser. No. 565,276

7 Claims. (Cl. 73—188)

This invention relates to automatic measuring apparatus, and more particularly, to instruments for measuring the direction of air flow.

Rotatably mounted mechanical wind vanes coupled by mechanical or electrical means to an indicator and in some instances to an automatic recording apparatus have long been widely used to measure wind direction. Mechanical wind vanes depend upon the force of the air flowing obliquely into a surface to position the vane in alignment with the direction of flow of the air. The rotational inertia of a wind vane mounted on bearings and adapted to actuate the indicating means is substantial. Accordingly, the high inertia characteristics of mechanical wind vanes limit their response to only gross variation in wind direction and completely mask small amplitude and high frequency wind direction fluctuations.

Vertical or elevational components of wind direction are a useful meteorological parameter and when considered by direct observation or when considered implicity as a component of a three dimensional or total wind vector, constitute an index of diffusion rates of contaminants in the atmosphere, atmospheric turbulence, and atmospheric stability. The conventional wind vane is limited as a practical device to measurement of only horizontal or azimuthal components of wind direction. Consequently, the elevational wind vector component and the total three dimensional wind vector were, prior to this invention, measured infrequently and with little precision.

One object of the present invention is to provide an apparatus with negligible inertia characteristcs, for precise measurement of small amplitude and high frequency fluctuations in the wind direction.

Another object of the present invention is to provide an appaartus readily adapted to measurement of vertical wind components and the total three dimensional wind vector.

Another object of the present invention is to provide a sensitive apparatus not dependent upon energy derived from the wind for measuring low velocity components of the total three dimensional wind direction.

Still another object of the present invention is to provide an apparatus readily adapted to directly measure and record the turbulence in a stream of moving air in terms of statistical parameters characterizing turbulent air flow.

The present invention is, briefly, an apparatus for automatically determining and recording the three dimensional wind vector. comprising a rotatably mounted azimuthal wind component sensing head, an elevational wind component sensing head mounted to the azimuthal head and adapted to rotate therewith, and a two independent variable function automatic recording means connected electrically to the two sensing heads and adapted to simultaneously and automatically record as a single function of two variables the angular displacements of the two sensing heads as they follow variations in the respective wind direction components thereby recording the total three dimensional wind direction.

The sensing heads each comprise a single curved tube open at the ends and provided within the interior thereof with a heat source and two electronic temperature sensing means. The temperature sensing means are adapted to emit a direct current electrical signal having a polarity related to the direction of air flow through the tube. Each sensing head has associated with it a motor adapted to rotate the tube about an axis, means for powering the motor responsive to the signal emitted by the electronic temperature sensing means positioned within the respective tubes, and a synchro generator mechanically coupled to each of the motor shafts. The generators are electrically connected to the recording means and adapted to record the angular displacements of the tubes about their respective axis of rotation. When the open ends of either rotatably mounted sensing head tube are positioned asymmetrically with respect to the wind direction, a pressure difference due to the dynamic effects of air flowing at different oblique angles over the open ends of the tube is induced between the two ends thereof, and gives rise to air flowing through the tube toward the direction of least pressure. Air flowing axially through the curved tube conveys cool air over the upstream temperature sensing means and warm air from the heat source over the downstream temperature sensing means. The difference in temperature between the two temperature sensing means within the tube is readily converted to an electrical error signal, which is fed into and actuates the electronic means, in turn powering the motor adapted to rotate the tube, repositioning the open ends thereof symmetrically with respect to the wind direction component at right angles to the axis of rotation of the tube, thus equalizing the pressure at the two ends of the tube. The synchro generators coupled to the motor shafts and electrically connected to the recorder generate readily recorded signals which are proportional to the movements of the motors and therewith proportional to the variations in the components of the wind direction.

My invention is further illustrated in the accompanying drawings in which:

Figure 1 is an elevational view partly cut away showing one embodiment of the sensing heads and their respective mountings;

Figure 2 is a schematic diagram showing the electrical components and connections between the components and the sensing heads shown in Figure 1;

Figure 3 is a sectional view of the sensing heads taken on line 3—3 of Figure 1;

Figure 4 is a sectional view of the azimuthal sensing head taken on line 4—4 of Figure 1; and Figure 5 is a schematic circuit diagram of the electronic components shown in Figure 2.

Figure 1 is an elevational view partly cut away showing an azimuthal component wind direction sensing head 10 mounted to a vertical rotating shaft 12 by means of a bracket 14, an elevational wind component wind direction sensing head 16 mounted on a bracket 18 disposed above the azimuthal component head 10 and adapted to rotate therewith. The shaft 12 rotates in a thrust bearing 20 and is held in a vertical position by a sleeve bearing 22. The angular displacement of the shaft 12 is regulated by rotation of a shaft 24 of a motor 26 which is disposed immediately adjacent to the shaft 12 and is coupled thereto by means of a gear 28 mounted concentrically to the shaft 12 and the gear 30 mounted concentric to the shaft 24. The shaft 12 is free to rotate about its vertical longitudinal axis in response to rotation of the motor 26. The upper end of the shaft 12 is provided with a bracket 14 having two short vertical extension 14a and 14b.

The azimuthal component sensing head 10 comprises a tube 34 open at both ends 36 and 38. The tube 34 has a center-line lying within a single plane which is curved near each of the ends 36 and 38 of the tube. The planes of the open ends 36 and 38 of tube 34 are mutually perpendicular planes and are each normal to the plane of the center-line lying at the respective ends of the tube 34. The central portion of the tube 34 is straight, and is mounted rigidly within the clamps 32a and 32b. Within the interior of the tube 34 spaced an equal distance from either end is a heating element 40 comprised of a resistance wire 42 which may be enclosed in a metal sheath coiled in a spiral and mounted to an insulated socket 44 one end of which protrudes into the tube 34, the other end thereof extends to the exterior of the tube 34. Electrical leads 46 and 48 are connected electrically to the ends of the resistance wire coil 42, pass through the socket 44 and are conducted downward along the shaft to electrical contact means which are described in detail below. In addition to the heat source 40, the tube 34 contains two heat sensing means 50 and 52 positioned on the center-line of the tube spaced an equal distance on either side from the heat source 40. The heat sensing means 50 and 52 are comprised of copper-constantan thermocouple junctions 54 and 56 held in position by insulated sockets 58 and 60 which extend through the wall of the tube 34. The thermocouple constantan leads 62 and 64 are passed through the insulated sockets 58 and 60 and connected electrically on the exterior of the tube 34. The copper leads 66 and 68 are passed through the insulated sockets 58 and 60, then conducted downward along the bracket 14 and the shaft 12 towards electrical contact means which will be described below.

The bracket 18 comprises two separate extensions 18a and 18b mounted respectively to the clamps 32a and 32b; the upper ends of the bracket 18 extensions terminate in sleeve bearings 70 and 72.

The elevational wind component direction sensing head 16 comprises a tube 74 having open ends 76 and 78, a straight central portion, and two curved portions; one curved portion being near either end. The tube 74 is curved so that the longitudinal axis of the straight central portion thereof forms the line of intersection of two mutually perpendicular planes, each plane further defining the axis of one curved end portion respectively and each curved end portion axis being perpendicular to the axis of the central portion. The planes of the open ends 76 and 78 of tube 74 are mutually perpendicular and are each normal to the axis of their associated end portion. The tube 74 is held within the sleeve bearings 70 and 72 and adapted to rotate about its longitudinal axis about the central portion thereof. A motor 80 mounted to the bracket extension 18a is mechanically coupled by means of a gear 82 to a second gear 84 rigidly mounted concentrically about the central portion of the tube 74 between the sleeve bearings 70 and 72.

A heat source 86, comprising a spiral of resistance wire 88, is held within the interior of the central portion of the tube 74 by means of an insulated socket 90. The ends of the wire spiral 88 are connected to leads 92 and 94. A socket 90 extends through the wall of the tube 74 and passes the electrical leads 92 and 94 from the interior to the exterior of the tube 74. The leads 92 and 94 are passed down the bracket 18, down the bracket 14, downward along the shaft 12, and connected to the electrical contact means which will be described below. In addition to the heat source 86, the tube 74 contains within the interior thereof two heat sensing means 96 and 98 disposed on the center-line of the tube 74 one on either side spaced an equal distance from the resistance wire spiral 88. The heat sensing means 96 and 98 are copper-constantan thermocouple junctions 100 and 102. Each thermocouple junction is comprised of a constantan lead 104, 106, which passes from the exterior to the interior of the tube 74 through insulated sockets 108 and 110 extending through the wall of the tube 74, and copper leads 112 and 114 which also pass respectively through sockets 108 and 110. The con- stantan leads 104 and 106 are connected electrically on the exterior of the tube 74. The copper leads 112 and 114 are passed downward through the extensions of the bracket 18, through the bracket 14, downward along the shaft 12 and are connected to electrical contact means described below.

A synchro generator 116 mounted adjacent the shaft 12 is coupled mechanically to the gear 28 by means of a gear 118. The generator 116 is adapted to generate electrical signals exactly proportional to the rotational displacement of the shaft 12. Electrical leads 120, 121, and 122 conduct electrical signals from the generator. A second synchro generator 124 mounted to the bracket extension 18a, coupled by means of gear 126 to the gear 82, is adapted to generate electrical signals in response to angular movements of tube 74 within the bearings 70 and 72. Electrical leads 128, 129, and 130 conduct electrical signals from the generator 124. The leads 128, 129, and 130 are passed down along the bracket 18, the bracket 14, downward along the shaft 12 to electrical contact means described below.

A tachometer 132 mounted adjacent the shaft 12 is mechanically coupled by an extension of the motor shaft 24, to the motor 26. Copper lead 66 from the azimuth tube thermocouple 50 is connected electrically through the electrical contact means, which will be described below, to one of the output terminals of the tachometer 132, and electrical lead 134 conveys the thermocouple electrical signal as modified by movement of the tachometer from the tachometer to electronic means which are described below. A second tachometer 136 is mounted to the bracket extension 18b and is mechanically coupled to the shaft of the motor 80 by means of gears 126 and 82. Copper lead 112 from the elevational tube thermocouple 100 is conducted down the bracket extension 18b and into one of the output terminals of the tachometer 136. A lead 138 to the second output terminal of the tachometer 136 is conducted down the bracket extension 18b, down bracket 14, and downward along shaft 12 to the electrical contact means described below.

Figure 2 shows the lower portion of the shaft 12 and the multiple electrical contact means or apparatus 140 referred to above. The contact apparatus 140 comprises a plurality of slip rings 142a, 142b, 142c, 142d, 142e, 142f, 142g, 142i, 142j, 142k, 142l, and stationary contacts 144a to 144l held fixed with respect to the slip rings 142a to 142g, 142i to 142l, by means of the bracket 146. The electronic circuit associated with the azimuth sensing head 10 for interpreting the error signals from the thermocouples 50 and 52 and powering the motor 26 in response thereto comprises a combined converter and voltage amplifier 148, a servo drive circuit 150 and a power supply 152; all of these are mounted remote from the azimuth sensing head 10 and are connected electrically thereto, as will be described below, through slip rings 142a, 142b, 142k, 142l, and contacts 144a, 144b, 144k, and 144l. An identical inverse feedback servo loop is associated with the elevational component wind direction sensing head and comprises a converter and voltage amplifier 154, a servo drive circuit 156, and a power supply 158; similarly, these components are mounted remote from the elevational sensing head 16, and are connected thereto, as will be described below, through slip rings 142a, 142b, 142c, 142d, 142e, 142f, 142g, 142i, 142j, and contacts 144a, 144b, 144c, 144d, 144e, 144f, 144g, 144i, and 144j.

Contacts 144a and 144b are connected by means of leads 160 and 162 to the 110 volt 60 cycle mains. The slip rings 142a and 142b in shaft 12 are connected to the heat source leads 46, 48, 92 and 94. The resistance elements 42 and 88 are connected in parallel and may be heated to a cherry red glow when the switch 164 in lead 162 is closed.

Figure 5 shows the circuitry common to both the azimuthal and elevational servo loops. References in the following description will be made to the azimuthal servo circuit only; however, it is to be clearly noted that a servo loop circuit is associated with the elevational sensing head which is identical to that described below pertaining to the azimuthal sensing head. The converter and voltage amplifier 148 comprise a reed converter 166 and an input transformer 168 having a center tapped primary 170. The converter coil 167 is powered through leads 167a, 167b which are connected to the low voltage secondary side 169a of a power transformer 169; the primary side of the power transformer 169 is connected across the 60 cycle 110 volt A.C. mains. The thermocouple junctions 50 and 52 are connected electrically exterior of the tube 34 by the constantan leads 62 and 64. Copper lead 66 from the thermocouple 50 is connected to one terminal of the D.C. tachometer 132, and lead 134 connects the second terminal of the tachometer 132 with the reed 174. The copper lead 68 from the thermocouple 52 is connected to the center tap 170a of the input transformer primary. The converter 166 constitutes a synchronously driven single pole, double throw switch operated at line frequency. In operation, the converter switches the input signal through alternate halves of the input transformer primary 170. As a result, a symmetrical 60 cycle wave is produced at the input transformer secondary winding. Depending upon the polarity of the D.C. signal from the thermocouples 50 and 52 the 60 cycle wave appearing on the input transformer secondary 180 will lead or lag, the 110 volt 60 cycle wave of the power mains. The motor 26 is a two phase synchronous balancing motor; one of the two motor windings is shunted across the 60 cycle mains, the remaining motor winding is powered by the 60 cycle wave, suitably amplified, which appears on the secondary of the input transformer 168. The motor shaft 24 is rotated, accordingly, in response to the phase difference between the two 60 cycle waves applied to the opposed motor windings.

Means for amplifying the 60 cycle wave appearing at the input transformer 168 are described below. The secondary coil 180 of the input transformer is connected directly to the grid 182 of the first stage of the amplifier 184. The cathode 186 of the first stage is heated by the filament 188 which in turn is powered through connection with the filament power supply leads XX. All the other vacuum tube filaments in the circuit are powered similarly by connection with filament power supply leads XX. The plate of the first amplification stage 184 is R.C. coupled to the second stage 190 by means of the condenser 192 and resistor 194. The plate of the second stage is R.C. coupled to the third stage by means of condenser 198 and variable resistor 200. The variable resistor 200 is utilized as a gain control for the amplifier 148. The third amplification stage 202 is R.C. coupled by means of condenser 204 and resistor 206 directly to the servo drive circuit described below. A rectification stage comprising the triode 208 is utilized for regulating plate voltages of the amplification stages 184, 190 and 202. A filter circuit comprised of condensers 210a, 210b, 210c, and resistors 212a, 212d is inserted between the power supply terminal 214 and the cathode 218 of the rectifier tube 208. The resistors 212b, 212c, and 212e are used for plate resistors for the first three stages of amplification. The grid 216 and cathode 218 of the rectifier are directly connected together; thus the triode 208 is utilized as a diode. The rectifier plate 220 is connected directly to the power supply lead 222 completing the circuit from the power supply. The power supply through leads 214 and 222 furnish alternating current to the rectifier stage and filter for maintaining the plate potential on the amplification stages.

The third stage 202 of the voltage amplifier is R.C. coupled to a common grid terminal 223 of a power amplification stage comprising four triodes 224, 226, 228 and 230 having their plate terminals connected in parallel pairs. The plates of the pairs of triodes are connected to one another and in turn the common plate lead of each pair is connected to one end of the secondary side of an output transformer 232. The primary side 240 of the output transformer 232 is connected across the 110 volt 60 cycle mains. A center tap lead 234 from the secondary side of the output transformer 232 is connected to a first winding 236 of the servo motor 26. The first motor winding circuit is completed by connecting the second terminal 238 thereof directly to the power main lead 214. The second motor winding is connected directly across the 110 volt 60 cycle mains through motor winding terminals 248 and 250. The phase of the second winding is readily adjusted by means of the capacitor 246 placed in series connection with the motor windings terminal 250.

The servo motor drive circuit 150 operates as follows: The common plate terminal of only one pair of tubes 224, 226 and 228, 230 is positive while the other is negative; as a result, each pair conducts only during alternate halves of the cycle. With no signal applied to the common grid lead 223 of the four triodes 224, 226, 228, 230, the output or plate current from the four tube circuit comprises two pulses per cycle. If the pulses are equal, no 60 cycle component appears in the output. However, when a 60 cycle signal, in or out of phase with the line voltage is applied to the grid lead 223, one of the plate pulses will increase as the other decreases, thereby forming a 60 cycle component in the output. Depending upon the phase of the signal applied to the grids, the resulting 60 cycle component appearing on the center tap lead 234 of the output transformer 232 will be either in or out of phase with the line voltage, and if out of phase either leading or lagging the line voltage wave. If the resulting 60 cycle signal appearing on the center tap lead 234 is in phase with the line voltage wave, the motor 26 will be balanced and no rotation initiated. If the resulting 60 cycle signal leads or lags the line voltage wave the motor 26 will, accordingly rotate in a direction to balance the fields induced by the out of phase voltage waves applied to the twin motor windings.

The azimuthal synchro generator 116 leads 120, 121, and 122 are connected electrically to a first group of input terminals of a recorder 254. The elevational synchro generator 124 leads 128, 129 and 130 are passed downward through bracket 18a, through bracket 14, shaft 12, slip rings 142c, 142d and 142e, stationary contacts 144c, 144d, and 144e, and connected electrically to a second group of input terminals on the recorder 254. A favorite method of recording and the one illustrated in Figure 2 utilizes a single channel pen recorder having a chart drive adapted for response to a second signal. The azimuthal generator signals are fed into the pen drive mechanism of the recorder 254 on leads 120, 121 and 122; accordingly, the pen is caused to move laterally across the chart in response to rotational movements of the azimuthal sensing head. The electrical signals from the elevational synchro generator are connected to the recorder 254 chart drive mechanism by means of leads 128, 129, and 130. The chart is accordingly moved longitudinally in response to rotation of the elevational component sensing head. When the apparatus is powered and set to record the azimuthal and elevational variations in the wind direction the recorder pen scribes curves on the chart which may be interpreted by simply referring all horizontal components of the scribed curve to azimuthal variation in wind direction and all vertical components of the curve to elevational variations in the wind direction.

The apparatus of my invention described above is prepared for use by mounting the shaft 12 in its bearings 20 and 22 in a vertical position at a site exposed to the flow of air which it is desired to examine. Commonly such a site would be a building rooftop, an open field, or a tower. The electronic apparatus comprised of the converter voltage amplifiers, servo drives, power supplies and recorder apparatus is normally mounted remote from the sensing heads and indoors. The resistance coils 40 and 88 contained within the tubes 34 and 74 are heated by closing the switch 164 and supplying electrical energy thereto through the leads 160 and 162. If the azimuthal component tube 34 is positioned asymmetrically with respect to the azimuthal component of the total wind vector, air will pass across the ends 36 and 38 of the tube 34 at different angles, giving rise to dynamic effects which result in unequal pressures between the two ends 36 and 38 of the tube 34. In response to this induced pressure differential, air will flow from the region of higher pressure past the heating element 42 toward the region of lower pressure. One of the temperature sensitive thermocouples 50 and 52 positioned within the tube but downstream of the air flow will be heated and the thermocouple positioned upstream of the air flowing through the tube will be cooled. A direct current flows through the leads 62 and 64 coming from the thermocouples 50 and 52 whenever the two thermocouples are at different temperatures. The polarity of the current is controlled by the relative temperature between the copper-constantan thermocouple junctions; electrons will flow in the constantan leads 62, 64 toward the thermocouple junction having the cooler temperature. The electrical signal so generated by the temperature differential between the thermocouple junctions passes down lead 66 through the appropriate slip ring 142 and contact 144 and through the direct current tachometer 132. The tachometer 132 reduces the signal current in proportion to the rotational speed of the shaft 12. The tachometer serves to damp the signal in proportion to the angular velocity of the sensing head and thus reduces overshooting and hunting of the rotating tubes 34 and 74. The signal from the thermocouple junctions modified by the tachometer is fed into a vibrating reed converter 166, converted to an alternating current signal having the voltage current phase relationship adjusted to lead or lag depending upon the polarity of the direct current signal flowing in the thermocouple leads 66 and 68. The secondary side 180 of the input transformer 168 is coupled to the first stage of a three-stage power amplifier. The plate supply voltage of the threestage power amplifier is furnished by means of a rectifier stage 208 and a filtering network. The rectifier and filtering network are powered from a conventional alternating current power supply through leads 214 and 222. The output from the plate of the third stage 202 of the three-stage voltage amplifier is R.C. coupled to the servo drive circuit 150. The servo drive circuit is comprised of a power amplification stage having the output thereof connected to the secondary side of an output transformer 232. The servo motor 26 is connected through the first winding to the secondary side of a center tapped output transformer 222, and connected through the second and opposing windings directly across the primary side of the output transformer 232. The motor 26 is responsive to variation in the phase relationship of the voltage waves supplied to the two opposed windings. Accordingly, change in polarity of the D.C. signal from the thermocouple junctions 50 and 52 will change the direction of rotation of the shaft 24 and the motor 26; the speed of rotation of the shaft 24, and the motor 26, is related to the magnitude of phase differential between the opposing sets of motor poles; thus the temperature differential between the thermocouple junctions induced by the flow of air through the sensing head tubes 34 and 74 will be reflected in the angular acceleration of the servo motors 26 and 80.

All movements of the shaft 12 activate the synchro generator 116 and give rise to an electrical signal flowing in leads 120, 121, and 122 proportional to the angular displacement of the synchro generator shaft. All electrical signals passed along the leads 120, 121, and 122 and received by the pen drive mechanism of the recorder 254 displace the recorder pen proportionately and thus record the direction of the azimuthal component wind variation. The electrical signal from the elevational component synchro generator 124 is passed down leads 128, 129, and 130 into the chart drive mechanism of the recorder 254, and thus the elevational component wind variations are recorded simultaneously with the azimuthal component variations, both components being recorded as a single function.

With the apparatus described above variations in the azimuthal or elevational components of the wind direction having a frequency as high as 10 cycles per second and angular differences as small as 3 degrees are readily detected and may be recorded.

It is readily seen that the azimuthal and elevational angle position signals derived from the synchro generators 116 and 124 may be advantageously utilized for other recording and indicating purposes than described above. For example, the individual azimuthal and elevational component signals may be fed into galvanometers and observed as the movement of a needle over a dial. Similarly, the individual wind direction components may be fed into a multiple channel recorder and each recorded as a function of time. The azimuthal and elevational synchro generator signals may be tied into the horizontal and vertical deflection plates through suitable amplifiers and thus the wind vector may be observed graphically on an oscilloscope screen.

The true three dimensional wind vector comprising both the magnitude or speed and the direction of the wind may be readily measured by the apparatus of my invention by adding thereto an anemometer. The anemometer may be a calibrated hot wire, a hot thermocouple, a thermistor bead, a generator having blades on the shaft thereof, or any other wind speed measuring apparatus. A preferred position for mounting a hot thermocouple anemometer, which is a preferred form of anemometer, is above the bearing 70 on a small bracket which would place the sensitive element of the anemometer on the vertical axis of rotation of the shaft 12, thereby reducing spurious readings due to acceleration. The electrical signal proportional to the speed of the wind may be conducted down leads to slip rings and contacts about the shaft 12 and to a pen recorder or to a graphic observation means. One convenient means of utilizing the anemometer signal is to feed the anemometer signal into the appropriate terminals of an oscilloscope connected to the direction sensing heads 10 and 16 as described above, whereby the intensity of the image on the oscilloscope screen is made a function of the wind speed. By this arrangement the three dimensional wind vector may be readily visualized as a function of time.

The foregoing specification and accompanying drawings are merely illustrative. The scope of my invention is intended to be limited only by the following claims.

What is claimed is:

1. An apparatus for measuring the three dimensional wind direction comprising a rotatably mounted azimuthal component wind direction sensing head, an elevational component wind direction sensing head mounted to the azimuthal head and adapted to rotate therewith, the azimuthal component wind direction sensing head comprising a first tube having a curved center-line lying in one plane, and having open ends whose planes defined thereby are mutually perpendicular, a rotatably mounted shaft having a vertical axis of rotation and a bracket, the tube being mounted on the bracket, with the plane of the curve disposed at right angles to the shaft axis, a heat source disposed within the curved tube, two temperature sensing means disposed in the tube on the center-line thereof, one being placed on either side of the heat source a distance therefrom, said two temperature sensing means having equal electrical signal outputs under like conditions, a motor disposed to rotate the shaft, electronic means connected to and between the two temperature sensing means and the motor and adapted to power the motor responsive to differences in electrical signals from the temperature sensing means, a synchro generator having a rotor mounted adjacent the shaft and having the rotor mechanically coupled to the shaft for rotation thereby, and means for conducting an electrical signal proportional to the angular displacement of the shaft from the generator whereby air caused to flow through the tube when the tube ends are disposed asymmetrically with respect to the azimuthal wind component causes cooling of the temperature sensing means upstream of the heat source and heating of the temperature sensing means downstream of the heat source, wherewith the unequal electrical signals from the temperature sensing means activate the electronic means which powers the motor, therewith rotating the shaft until the tube ends are positioned symmetrically with respect to the azimuthal wind component and air ceases to flow through the tube, the signal passed through the means for conducting signals from the synchro generator being proportional to the angular displacement of the shaft; the elevational wind component sensing head comprising a second tube having a center-line, a straight central portion, curved end portions, and open ends, the second tube being curved so that the longitudinal axis of the straight central portion thereof forms the line of intersection of two mutually perpendicular planes, each plane further defining the axis of one curved end portion respectively and each curved end portion axis being perpendicular to the axis of the central portion, a sleeve bearing disposed about the central portion of the second tube, the second tube and sleeve bearing being mounted on the same bracket as that on which the first tube is mounted, a second heat source disposed within the second tube, a second set of two temperature sensing means disposed on the longitudinal axis of the second tube, one on either side of the second heat source a distance therefrom, said second set of two temperature sensing means having equal electrical signal outputs under like conditions, a second motor mounted on the bracket and adapted to rotate the elevational component tube within the bearing, a second electronic means connected to and between the second set of two temperature sensing means and the second motor and adapted to power the second motor in response to differences in electrical signals from the second set of temperature sensing means, a second synchro generator having a rotor mounted adjacent the second motor on the bracket and mechanically coupled to the second motor for rotation thereby, and means for conducting an electrical signal proportional to the angular displacement of the elevational component tube about the longitudinal axis thereof from the second generator whereby air caused to flow through the tube when the elevational component tube ends are disposed asymmetrically with respect to the elevational wind component causes cooling of the temperature sensing means upstream of the second heat source and heating of the temperature sensing means downstream of the heat source wherewith the unequal electrical signals from the second set of temperature sensing means activates the second electronic means, powering the second motor, wherewith the elevational component tube is rotated until the tube ends are positioned symmetrically with respect to the elevational wind component and air ceases to flow through the tube, the signal passed through the means for conducting a signal from the second synchro generator being proportional to the angular displacement of the elevational component tube in the bearing; and a two independent variable function continuous recorder having first and second input terminals, the first synchro generator signal conducting means being connected to one recorder input terminal and the second synchro generator signal conducting means being connected to the second recorder input terminal whereby variations in the azimuthal wind component and variations in the elevational wind component may be simultaneously and automatically measured and recorded as a single function thereby measuring and recording the total three dimensional wind direction.

2. An apparatus for sensing wind direction comprising a tube having a center-line lying in one plane, the tube being open at both ends, and curved about a right angle such that the center-line at the ends of the tube is perpendicular to two mutually perpendicular planes, a rotatably mounted shaft having a bracket, the tube being rigidly mounted on the bracket, an electrical resistance wire heat source disposed within the tube, two copper-constantan thermocouple junctions mounted within the tube on either side of the heat source, said two thermocouple junctions having equal electrical signal outputs under like conditions, a servo motor adapted to rotate the shaft, and electronic means having an input and an output end and further comprising a vibrating reed converter and an amplifier, the outputs of said thermocouple junctions being connected electrically to the input of the electronic means and the output of the electronic means being connected electrically to actuate the servo motor and therewith position the tube ends symmetrically within the wind field.

3. An apparatus for sensing wind direction comprising a tube open at both ends and curved to form a right angle, the tube further having a center-line lying in one plane and being perpendicular at the ends of the tube to two mutually perpendicular planes, a rotatably mounted shaft having a bracket, the tube being rigidly mounted on the bracket, an electrical resistance wire heat source disposed within the tube, two copper-constantan thermocouple junctions mounted within the tube on either side of the heat source, said two thermocouple junctions having equal electrical signal outputs under like conditions, a servo motor adapted to rotate the shaft, a synchro generator mechanically coupled to the shaft, an electronic angle position recorder electrically connected to the synchro generator, and electronic means having an input and an output end and further comprising a vibrating reed converter and an amplifier, the outputs of said thermocouple junctions being connected electrically to the input of the electronic means and the output of the electronic means being connected electrically to actuate the servo motor and therewith position the tube ends symmetrically within the wind field to minimize air flow through the tube and differential cooling of the thermocouple junctions, wherewith the angle position recorder indicates the angular position of the shaft and therewith the wind direction.

4. An apparatus for measuring and recording the three dimensional wind vector comprising a rotatably mounted azimuthal component wind direction sensing head, an elevational component wind direction sensing head rotatably mounted to the azimuthal head and adapted to rotate therewith in the azimuthal plane and independently in the elevational plane, and a two independent variable function continuous recorder having first and second input terminals, the wind direction sensing heads each comprising a curved tube having open ends, each of said tubes being curved so that the planes defined by the open ends thereof are angularly displaced with respect to each other, sensing means disposed within each tube having outputs responsive to air flow through the tubes, the outputs of said sensing means being equal under like conditions, electronic means connected to each of the outputs of the sensing means, a motor connected to each of the electronic means to position the tubes in response to the outputs of the sensing means respectively, a first synchro generator adapted to generate an electrical signal proportional to the azimuthal angular displacement of one of the tubes, and a second synchro generator adapted to generate an electrical signal proportional to the elevational angular displacement of the other tube, the first synchro generator being connected to the first input terminal of the recorder and the second synchro generator being connected to the second input terminal of the recorder whereby the azimuthal and elevational wind components may be simultaneously measured and recorded as two variables of a single function characterizing the three dimensional wind vector.

5. An apparatus for sensing wind direction comprising a tube having a curved center-line adapted to lie in one plane and having open ends whose planes defined thereby are angularly displaced with respect to each other, a rotatably mounted shaft having a longitudinal axis of rotation and an end, a bracket mounted on the end of the shaft, the tube being rigidly mounted on the bracket, the plane of the curved tube being disposed at right angles to the shaft axis, a heat source disposed within the curved tube, two thermocouple junctions disposed in the tube on the center-line thereof, one being placed on either side of the heat source a distance therefrom, said two thermocouple junctions having equal electrical signal outputs under like conditions, a motor disposed to rotate the shaft, electronic means connected to and between the thermocouple junctions and the motor and adapted to power the motor responsive to differences in electrical signals from the thermocouple junctions, a continuous recording apparatus and a synchro generator having a rotor mounted adjacent the shaft, the rotor being mechanically coupled to the shaft for rotation thereby, the recording apparatus being electrically connected to the generator, whereby air caused to flow through the tube when the tube ends are disposed asymmetrically with respect to the wind direction causes cooling of the thermocouple junction upstream of the heat source, and heating of the thermocouple junction downstream of the heat source wherewith the unequal electrical signals of the thermocouple junctions activate the electronic means powering the motor therewith rotating the shaft until the tube ends are positioned symmetrically with respect to the wind direction and air ceases to flow through the tube, the recorder being adapted to record an electrical signal from the generator proportional to the angular displacement of the shaft therewith recording variations in the wind direction.

6. An apparatus for sensing wind direction comprising a tube open at both ends and curved in one plane to form a right angle, the tube further having a center-line which is perpendicular at the ends of the tube to two mutually perpendicular planes, a rotatably mounted shaft having a bracket, the tube being rigidly mounted on the bracket, an electrical resistance wire heat source disposed within the tube, two copper constantan thermocouple junctions mounted within the tube on either side of the heat source, said two thermocouple junctions having equal electrical signal outputs under like conditions, a servo motor adapted to rotate the shaft, and electronic means responsive to electrical signals from the thermocouples and adapted to actuate the servo motor in response to the difference in electrical signals from the two thermocouple junctions.

7. An apparatus for measuring and recording the wind direction comprising a tube having a center-line, a straight central portion, curved end portions, and open ends, the tube being curved so that the center-line of the straight central portion thereof lies wholly within a first pair of mutually perpendicular planes, the center-line of the tube at the ends thereof further being perpendicular to a second pair of mutually perpendicular planes, a sleeve bearing about the central portion of the tube, the tube being rotatable within said sleeve bearing, a shaft having a bracket, the tube and sleeve bearing being supported by the bracket, a heat source disposed within the tube, two thermocouple junctions disposed on the center-line of the tube, one on either side of the heat source a distance therefrom, said two thermocouple junctions having equal electrical signal outputs under like conditions, a motor adapted to rotate the tube within the bearing, electronic means connected to and between the heat sensing means and the motor and adapted to power the motor in response to differences in electrical signals from the thermocouple junctions, a synchro generator mechanically coupled to the motor and adapted for rotation thereby, and a continuous recorder, the generator being connected electrically to the recorder whereby air caused to flow through the tube when the tube ends are disposed asymmetrically with respect to the wind direction causes cooling of the thermocouple junction upstream of the heat source and heating of the thermocouple junction downstream of the heat source wherewith the unequal electrical signals from the thermocouple junctions activate the electronic means powering the motor and rotating the tube until the ends thereof are positioned symmetrically with respect to the wind direction and air ceases to flow through the tube, the recorder recording the electrical signal from the synchro generator therewith recording variations in wind direction.

References Cited in the file of this patent

UNITED STATES PATENTS

| | | |
|---|---|---|
| 1,285,868 | Wilson | Nov. 26, 1918 |
| 2,255,771 | Golay | Sept. 16, 1941 |
| 2,487,414 | Baxter | Nov. 8, 1949 |
| 2,620,658 | Piety | Dec. 9, 1952 |
| 2,709,365 | Piety | May 31, 1955 |
| 2,736,198 | Kuhn | Feb. 26, 1956 |
| 2,813,237 | Fluegel et al. | Nov. 12, 1957 |